United States Patent [19]
Tratz et al.

[11] 4,136,644
[45] Jan. 30, 1979

[54] TUBE HEAT EXCHANGER WITH HEATING TUBES

[75] Inventors: Herbert Tratz, Ottensoos; Richard Welch; Jürgen Hoffmann, both of Erlangen, all of Germany

[73] Assignee: Kraftwerk Union Aktiengesellschaft, Mülheim, Germany

[21] Appl. No.: 752,093

[22] Filed: Dec. 20, 1976

[30] Foreign Application Priority Data

Dec. 23, 1975 [DE] Fed. Rep. of Germany ....... 2558127

[51] Int. Cl.² .......................... F22B 1/02; F22B 37/54
[52] U.S. Cl. ..................................... 122/32; 122/382; 165/163
[58] Field of Search .................... 165/163; 122/32, 33, 122/34, 483, 382

[56] References Cited
U.S. PATENT DOCUMENTS

| | | | |
|---|---|---|---|
| 3,216,400 | 11/1965 | Taylor | 122/34 |
| 3,376,858 | 4/1968 | Romanos | 122/32 |
| 3,693,597 | 9/1972 | Kelp | 122/32 |
| 3,942,481 | 3/1976 | Bennett | 122/382 |
| 3,949,710 | 4/1976 | Reisacher | 122/34 |

*Primary Examiner*—Kenneth W. Sprague
*Attorney, Agent, or Firm*—Herbert L. Lerner

[57] ABSTRACT

A tube heat exchanger having a substantially cylindrical housing, a pair of adjacent cylindrical headers disposed in the housing, and a multiplicity of downwardly extending U-shaped heat exchanger tubes connecting the headers to one another, one of the headers being an inlet header and the other thereof being an outlet header, both of the headers being connectible to pressurized water lines of a pressurized water nuclear reactor, includes a feedwater supply connected to the housing below the outlet header for supplying a quantity of feedwater into the housing up to a given level partly filling the housing during operation of the heat exchanger, the heat exchanger tubes extending upwardly from the outlet header above the given feedwater level and being formed with a U-shaped bend located above the given level.

5 Claims, 4 Drawing Figures

TUBE HEAT EXCHANGER WITH HEATING TUBES

The invention relates to tube heat exchangers with heating tubes formed with U-shaped heads.

In pressurized-water nuclear reactor installations, the water which is heated in the nuclear reactor and which is under high pressure therein, is fed to heat exchangers. There, the pressurized water flows through a system of mutually parallel-connected tubes that are disposed in a cylindrical vessel. In this vessel, feedwater is provided which is to be vaporized and fed to a turbine as steam. For reasons of safety it is of particular advantage in a nuclear reactor installation if the connecting pipes which lead from the pressure vessel of the nuclear reactor to the heat exchangers serving to generate the steam, are as short as possible and extend in a straight line, because the probability of a pipeline break is then minimal and safety devices which protect against a break in the line due either to external or internal causes can be provided most simply and effectively.

A pressurized-water nuclear reactor installation is shown on page 5 of the publication of Kraftwerk Union, Order No. KWU-295 10792 57515, dated May, 1975. As is seen therein, in a pressurizedwater reactor installation, the pressurized-water inlet to and the pressurized-water outlet from the reactor pressure vessel are disposed approximately in one plane above the fuel elements. If the connecting lines from the reactor pressure vessel to the heat exchangers for generating steam are to be made as short as possible, it is necessary that, in the heat exchanger, the inlet and the outlet for the pressurized water be also close together. This is indeed the case for the heat exchangers in the above-mentioned publication, the pressurized water inlet and outlet lines thereof being located at the lower end of the heat exchangers.

It is accordingly an object of the invention of the instant application to provide a tube heat exchanger with heating tubes formed with U-shaped bends wherein the foregoing conditons are fulfilled and which, in addition, is suited for delivering superheated steam.

More specifically, the invention relates to a tube heat exchanger having a substantially cylindrical housing, a pair of cylindrical headers or manifolds disposed in the housing, and a multiplicity of downwardly extending U-shaped heat exchanger tubes connecting the headers to one another.

Such a heat exchanger has become known heretofore from Belgian Pat. No. 501,911, especially FIG. 5 thereof, wherein heat exchange occurs between two media, neither of which changes its state of aggregation. Dividing the cylindrical vessel into two halves over a large part of the cross section permits heat transfer by the counterflow principle. This heat exchanger is not provided, however, for generating superheated steam from feedwater.

With the foregoing and other objects in view, there is provided in accordance with the invention, in a tube heat exchanger having a substantially cylindrical housing, a pair of adjacent cylindrical headers disposed in the housing, and a multiplicity of downwardly extending U-shaped heat exchanger tubes connecting the headers to one another, one of the headers being an inlet header and the other thereof being an outlet header, both of the headers being connectible to pressurized water lines of a pressurized water nuclear reactor, a feedwater supply connected to the housing below the outlet header for supplying a quantity of feedwater into the housing up to a given level partly filling the housing during operation of the heat exchanger, the heat exchanger tubes extending upwardly from the outlet header above the given feedwater level and being formed with a U-shaped bend located above the given level.

The tubes of the heat exchanger according to the invention which project above the water level and extend in the upper part of the U-bend thereof transversely to the flow direction of the rising steam, serve simultaneously for superheating and drying the steam and act as separator for the water droplets entrained or swept along upwardly from the water surface. Due to the superheating zone above the water surface, a larger heat-exchanging area must be provided for a given output than would be necessary in a heat exchanger which does not furnish superheated steam. This increases the overall height or headroom of the heat exchanger in vertical direction over that of the installation disclosed in the aforementioned Kraftwerk Union publication. A special advantage of the construction according to the invention of the instant application over that of the heat exchangers shown in the Kraftwerk Union publication, is that the connection points for the pressurized water are located approximately in the middle of the heat exchanger housing, so that it is not necessary to enlarge the reactor building upwardly due to the greater overall height of the heat exchanger.

A further considerable advantage of the steam generator according to the invention, as compared to aforementioned heretoforeknown steam generators, is the existence of free or empty space below the heat-exchanging tubes, since impurities of the feedwater drop to the bottom between the tubes and can easily be withdrawn by suction therefrom. The requirements as to the chemical purification of the feedwater can therefore be reduced considerably when using the heat exchanger according to the invention, as compared to heat exchangers with tube sheets or plates at the bottom thereof.

In accordance with another feature of the invention, the tube heat exchanger includes a flow guide plate disposed in the housing and connected to the inner wall surface thereof above the feedwater supply and, inclusive of a part of the heat exchanger tubes, extending in a downward direction.

In accordance with a further feature of the invention, the tube heat exchanger includes means for supporting the housing secured to the latter at the outside thereof and at the level of the inlet and outlet headers.

In accordance with an additional feature of the invention, the inlet and outlet headers are disposed above one another transversely to the longitudinal axis of the substantially cylindrical housing and in a plane in which the longitudinal axis of the housing is disposed, respective halves of the heat exchanger tube being located on opposite sides of the housing and being bent in direction toward the outer wall of the housing, the heat exchanger tubes forming a pair of U-shaped loops on each of the opposite sides of the housing.

In accordance with a concomitant feature of the invention, the housing has a lower end, and a pipe union for a blowdown line is connected to the housing at the lower end thereof.

Other features which are considered as characteristic for the invention are set forth in the appended claims.

Although the invention is illustrated and described herein as embodied in tube heat exchanger with heating tubes, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
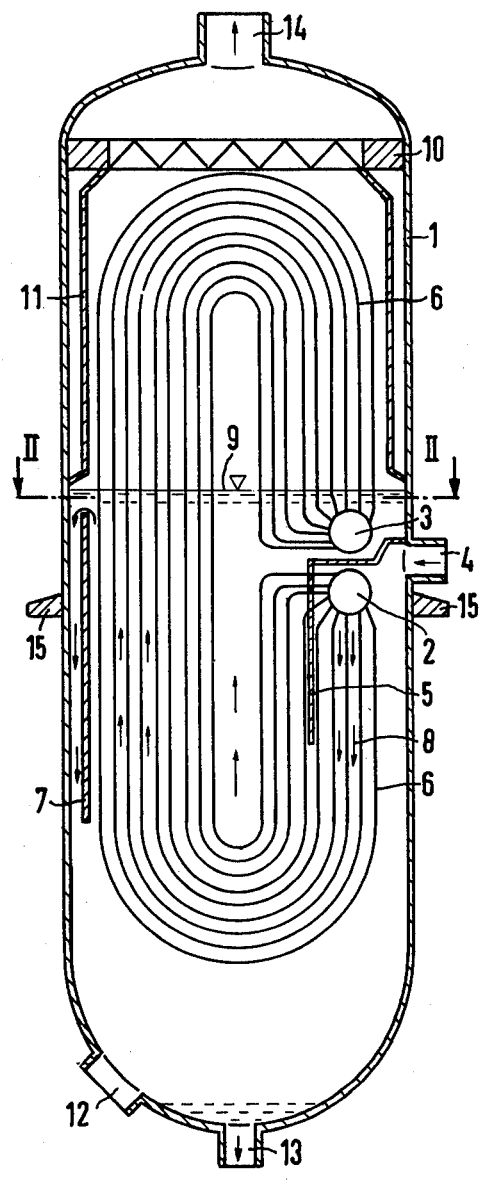
FIG. 1 is a diagrammatic longitudinal sectional view of a tube heat exchanger having tubes with U-shaped blends.
Figure 2:
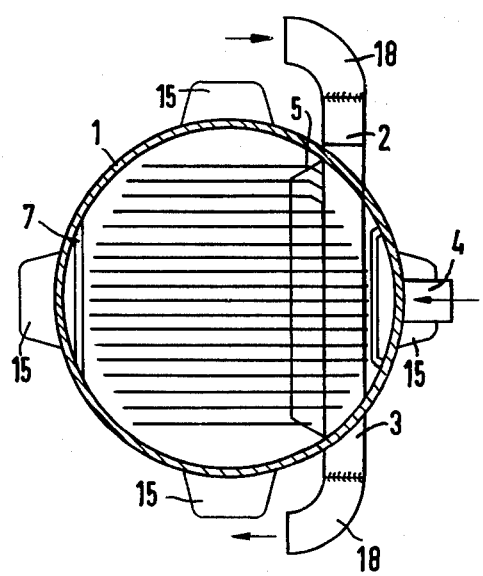
FIG. 2 is a cross-sectional view of FIG. 1 taken along the line II—II in the direction of the arrows.

Referring now to the drawing and first, particularly, to FIGS. 1 and 2 thereof, there is shown a heat exchanger according to the invention having a substantially cylindrical housing 1 in which respective inlet and outlet headers or manifolds 2 and 3 are anchored. The headers 2 and 3 are connected to pressurized-water lines 18 (FIG. 1) which lead to a non-illustrated reactor pressure vessel and a non-illustrated reactor coolant pump, respectively, of a nuclear reactor installation. A feedwater inlet 4 is located approximately at the level of the inlet header 2, which is located approximately in the middle of the housing 1 directly below the outlet header 3, as shown in FIG. 1. A guide plate or baffle 5 for the feedwater introduced through the feedwater inlet 4 causes the feedwater flowing into the housing 1 to flow downwardly initially. It is accordingly preheated by a part of the heat exchanger tubes 6. A guide plate or baffle 7 for the circulating water is located opposite the guide plate or baffle 5 and divides off a portion of the space within the housing 1 that is not filled with the heat exchanger tubes 6. The arrows 8 indicate the direction of the developing water flow.

The quantity of supplied feedwater is apportioned so that a water level 9 is formed directly above the outlet header 3. The heat exchanger tubes 6 protrude above and beyond this water level 9, as viewed in FIG. 1, and the vertical lengths thereof forming the superheater zone of the heat exchanger. In the region of the upper U-shaped bends thereof, the tubes 6 extend more-or-less horizontally and form, in this part thereof, a tube grid for steam rising upwardly from the bottom. This grid simultaneously serves for superheating and drying the steam and, furthermore, acts as a water separator.

Above the heat exchanger tubes 6 in the housing 1, as viewed in FIG. 1, a fine moisture separator 10 is additionally provided, wherein any water droplets that may yet be present are separated out. To guide the flow of the steam, steam guide plates or baffles 11 are provided. At the lower end of the housing 1, a manhole 12 is provided for removing impurities and, if necessary, for cleaning the base of the housing 1, as well as pipe union 13 for connecting a blowdown line to the housing 1. Steam leaves the heat exchanger through a steam outlet 14 located at the top of the housing 1. The heat exchanger housing 1 is provided, at about the level of the inlet and outlet headers 2 and 3 with supports or bearing members 15. This affords the advantage that thermal expansion of the housing 1 does not cause a shift in the level of the pipe unions for the inlet and outlet headers 2 and 3. This disposition of the supports 15 further ensures a high degree of resistance against shock or impact loads that might act upon the heat exchanger from the outside.

Figure 3:
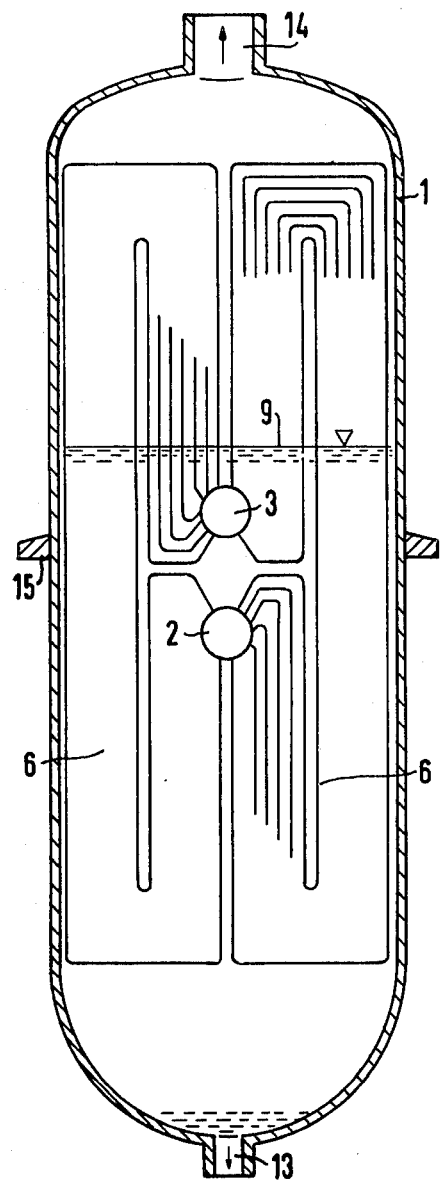
FIG. 3 is a view similar to that of FIG. 1 of another embodiment of the invention.
Figure 4:
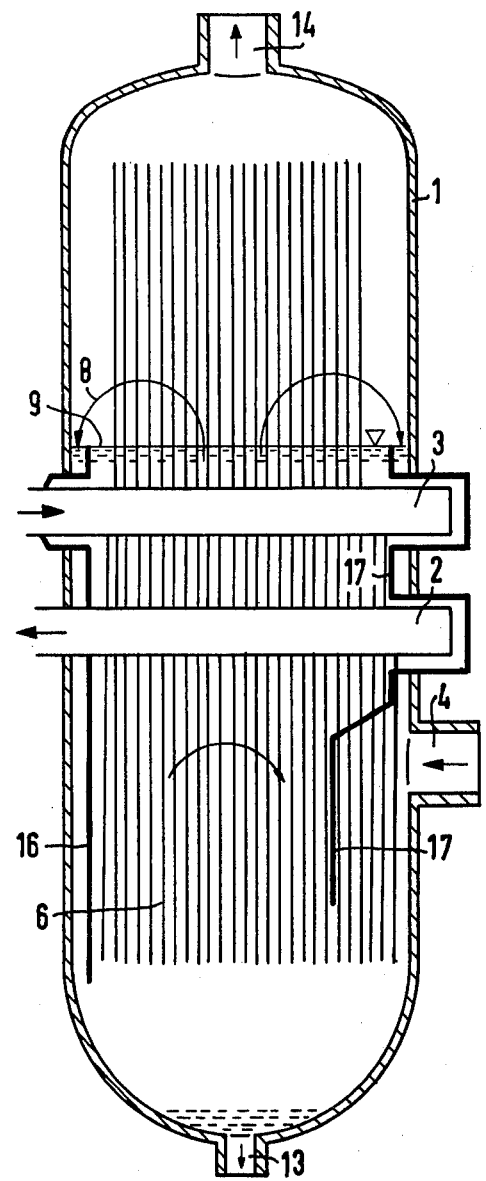
FIG. 4 is a longitudinal sectional view of FIG. 3 taken along the line IV—IV in the direction of the arrows.

Another embodiment of the invention is shown in FIGS. 3 and 4 wherein the inlet and outlet headers or manifolds 2 and 3 are located in the middle of the housing 1, extending through the longitudinal axis thereof, so that a larger surface area is afforded for connecting the heat exchanger tubes 6 than that provided in the embodiment of FIG. 1. The feedwater inlet 4 of the embodiment of FIGS. 3 and 4 is located below the inlet header 2. Baffles or guide plates 16 and 17 for the circulating water are provided on both sides of the steam generator as shown in the sectional view of FIG. 4. The baffle 17 extends inwardly below the inlet header 2, so that beginning from the level of the feedwater inlet 2, heat exchanger tubes 6 are disposed in the downwardly extending flow region of the circulating water. At the location of the feedwater inlet 2, the downwardly flowing circulating water is mixed with the supplied feedwater. The heat exchanging tubes 6 are bent in a U-shaped configuration, beginning from the middle of the heat exchanger in respective halves at opposite sides thereof, so that two U-shaped loops are provided in the housing 1 as shown in FIG. 3.

What is claimed is:

1. In a tube heat exchanger having a substantially cylindrical housing, a pair of adjacent cylindrical headers disposed in the housing, and a multiplicity of downwardly extending U-shaped heat exchanger tubes connecting the headers to one another, one of the headers being an inlet header and the other thereof being an outlet header, both of said headers being connectible to pressurized water lines of a pressurized water nuclear reactor, a feedwater supply connected to the housing below the outlet header for supplying a quantity of feedwater into the housing up to a given level partly filling the housing during operation of the heat exchanger, the heat exchanger tubes extending upwardly from said outlet header above said given feedwater level and being formed with a U-shaped bend located above said given level, and a flow guide plate disposed in said housing and connected to the inner wall surface thereof above said feedwater supply and, inclusive of a part of said heat exchanger tubes, extending in a downward direction.

2. Tube heat exchanger according to claim 1 including means for supporting said housing secured to the latter at the outside thereof and at the level of said inlet and outlet headers.

3. Tube heat exchanger according to claim 1 wherein said inlet and outlet headers are disposed above one another transversely to the longitudinal axis of said substantially cylindrical housing and in a plane in which said longitudinal axis of said housing is disposed, respective halves of said heat exchanger tubes being located on opposite sides of said housing and being bent in direction toward the outer wall of said housing, said heat exchanger tubes forming a pair of U-shaped loops on each of said opposite sides of said housing.

4. Tube heat exchanger according to claim 1 wherein said housing has a lower end, and including a pipe union for a blowdown line connected to said housing at said lower end thereof.

5. Tube heat exchanger according to claim 1 wherein said inlet header is located above said outlet header, and said flow guide plate extends substantially horizontally between said inlet and outlet headers and downwardly past said inlet header so as to separate part of said heat exchanger tubes from the remainer thereof.

* * * * *